June 26, 1962  R. T. GLASS  3,040,786
AUTOMATIC FILLER

Filed Jan. 8, 1960  2 Sheets-Sheet 1

INVENTOR
ROBERT T. GLASS
BY Beale & Jones
ATTORNEYS

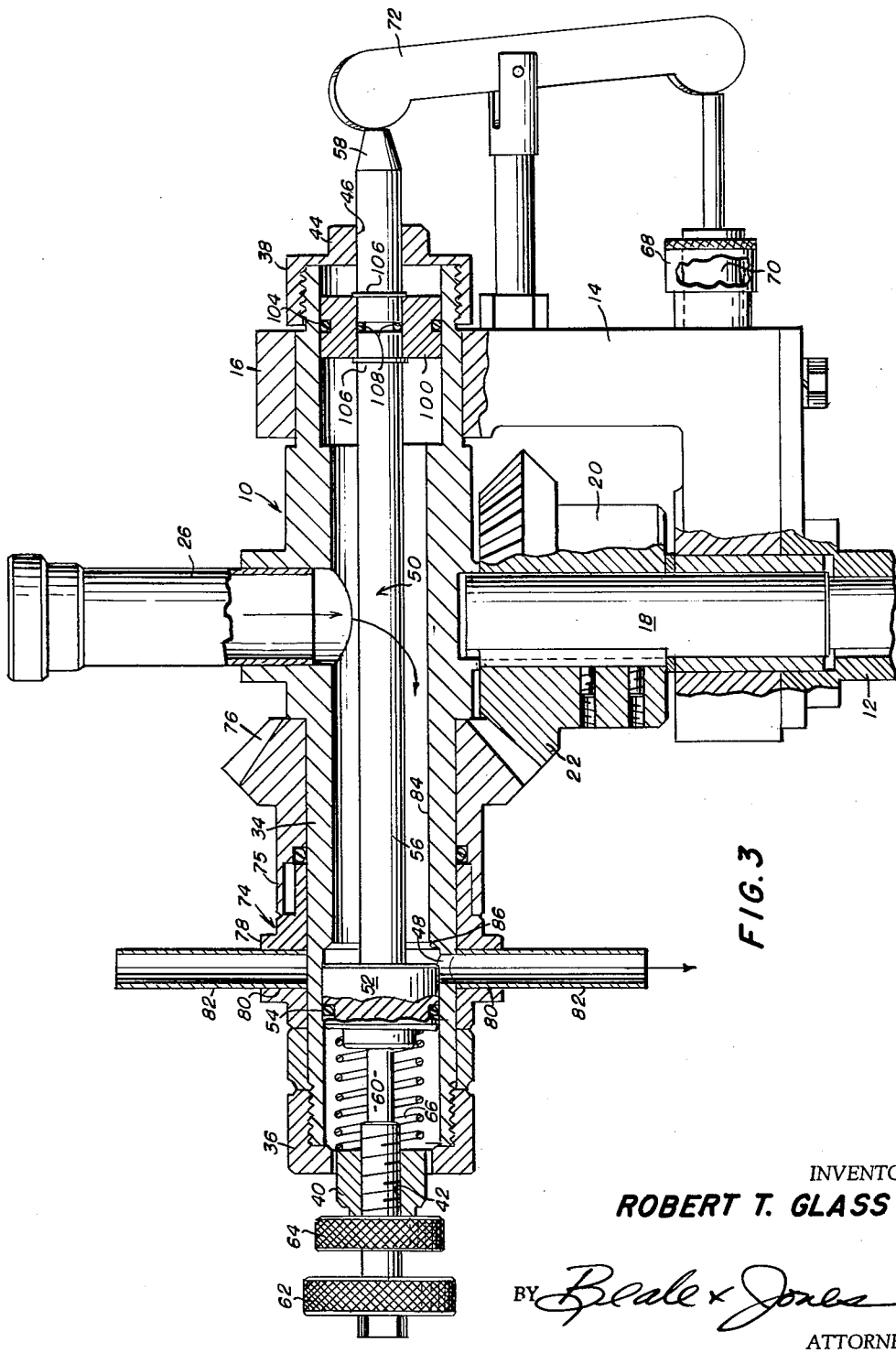

United States Patent Office 3,040,786
Patented June 26, 1962

3,040,786
AUTOMATIC FILLER
Robert Taylor Glass, 409 W. 6th St., Austin, Tex.
Filed Jan. 8, 1960, Ser. No. 1,199
9 Claims. (Cl. 141—131)

This invention relates to an automatic filler. More specifically, this invention relates to an automatic filler for successively filling continuously moving molds of a confection machine with an edible substance.

Still more specifically, this invention relates to an automatic filler for successively filling continuously moving mold receptacles, said filler being provided with means for controlling the amount of fluid dispensed and deposited in each of such receptacles.

This application is a continuation-in-part of my earlier copending application, Serial No. 669,755, filed July 3, 1957, now abandoned.

In my earlier copending application, I have disclosed an automatic filler including a tubular housing having a supply inlet and an outlet orifice. A plunger including a piston engaging the wall of the housing and a stem extending past the supply inlet is operable from without the housing to occlude to a selected degree the outlet orifice. The piston also serves to shut off the outlet orifice completely when the automatic filler is not operating.

While the earlier disclosed apparatus is practical and efficient, it has been found that the fluid under pressure in the housing when the device is not operating has at times forced the piston axially to open the outlet orifice causing undesired leakage.

It is, therefore, an object of this invention to provide means in an automatic filler, to preclude the movement of the piston by the pressure of the fluid within the filler housing.

This invention embodies other novel features, details of construction and arrangement of parts of which are hereinafter set forth in the specification and claims, and illustrated in the accompanying drawings, wherein:

FIG. 3 shows an enlarged partially sectional side view of the invention.

Figure 1:
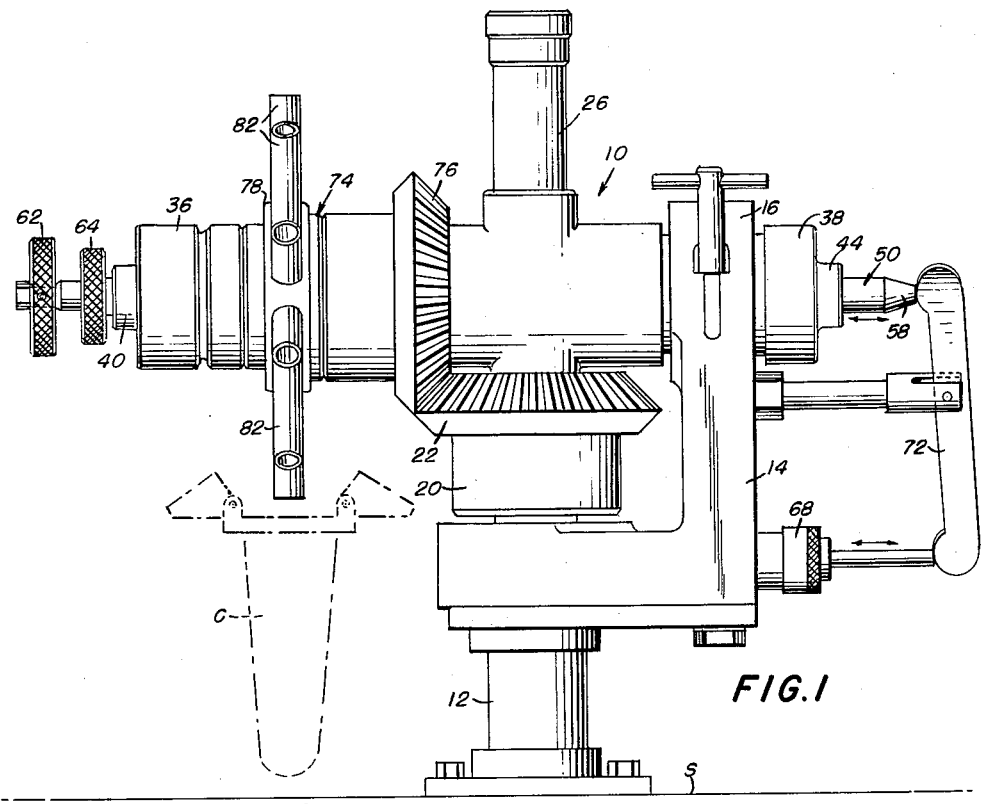
FIG. 1 is a side elevational view of the invention showing in dotted lines a portion of a conveyor with which said filler is adapted to operate.
Figure 2:
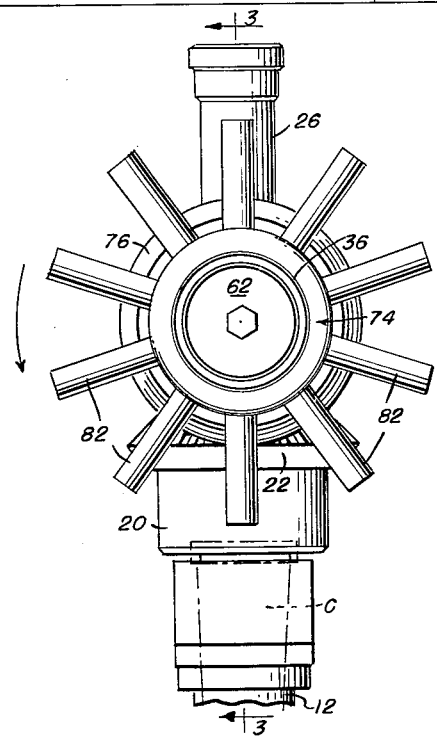
FIG. 2 is a front elevational view of the invention showing in dotted lines a portion of a conveyor with which said filler is adapted for use.

Referring more specifically to the drawings, the invention is shown in FIG. 1 to comprise a horizontally disposed filler 10 supported over the mold-carrying conveyor C with which the device is adapted for use. From the supporting surface S, hollow standard 12 extends upwardly. Standard 12 carries an L-shaped arm 14 which incorporates a clamp 16 encircling the filler. A drive shaft 18 extends upwardly (see FIG. 3) through the hollow standard 12 and has keyed to its upper end the bevel gear 20. A boss 22 on the bottom of the filler housing rides on the bevel gear, giving additional support.

A detailed idea of the structure of my invention is shown in FIG. 3. It can be seen that the filler 10 comprises a tubular housing 34 which is threaded at each end and receives the end caps 36 and 38 respectively. The end cap 36 is formed with a cylindrical projection 40 having a central threaded bore 42. Cap 38 is provided with thickened central area 44 which is apertured at 46.

In the middle of the tubular housing 34 as shown in FIG. 3 is a supply inlet 26 which is connected to a source of ice cream or other fluid. Toward the left of the housing on the underside of its wall is an outlet orifice 48.

Reciprocable within the tubular housing is the plunger 50 comprising a piston or head 52 adapted for liquid-tight engagement with the sides of the housing 34 and provided with a sealing O-ring 54 to prevent any possible leakage into the portion of the chamber to the left of the plunger as shown in FIG. 3. A stem 56 is connected to piston or head 52 and extends past the supply inlet and out of the housing through the aperture 46 in cap 38. Stem 56 terminates outwardly of the housing in a tapered portion 58.

The stem 56 also carries a second or "dummy" piston 100. It is disposed on the stem on the opposite side of the supply inlet 26 from the first piston or head 52. Piston 100, in similar manner to piston 52, engages the wall of the tubular housing. It is formed with a peripheral groove which accommodates a sealing O-ring 104 to assure that no fluid passes therebeyond to the right as indicated in FIGURE 3. To position the second piston on stem 56, the stem is preferably formed with circumferential grooves on either side of the second piston, said grooves respectively receiving snap rings 106 to block lateral movement of the piston along the stem. By this means, the piston 100 may be easily removed from stem 56 for inspection or replacement if desired. Additionally, to assure that no fluid escapes between the stem 56 and the piston 100, the stem may be formed intermediate the snap-ring-receiving grooves, with a relatively deep circumferential groove receiving a sealing O-ring 108.

Threaded bore 42 receives from the outside a threaded shaft 60 or stop member which extends into the interior of housing 34. The axial position of the stop member may be adjusted by a wheel 62 on the extreme outer end thereof. Intermediate end cap 36 and wheel 62 is the nut 64 also threadedly carried by shaft 60. To insure against the turning of the stop member 60, nut 64 may be tightened against projection 40 to serve as a lock.

Within the housing 34 the stop member 60 is encompassed by a spiral compression spring 66. The spring abuts the inner wall of end cap 36 at one end and the face of piston or head 52 at the other end. This biases the plunger 50 away from end cap 36. The inner end of stop 60 provides a positive limit of movement of plunger 50 toward end cap 36. Means for moving the plunger 50 toward end cap 36, for reasons which will be explained later, comprise a compressed air cylinder 68 mounted on the vertical part of the L-shaped arm 14. Cylinder 68 includes a piston 70 adapted, on pressurization of the cylinder, to pivot a lever 72 also mounted on the arm 14 to move plunger 50 toward end cap 36.

Fitting over the tubular housing in the area of the outlet orifice is the sleeve or outlet orifice closure member 74 of substantially the same inner diameter as the outer diameter of housing 34 in the area of orifice 48 so that it fits closely over the housing but still is adapted to be rotated with respect thereto. The sleeve 74 is keyed at 75 to the bevel gear 76. Sleeve 74 has a thickened annular area 78 which is formed with a plurality of apertures 80 preferably at evenly spaced intervals. Secured to the thickened area 78 over each of these apertures is a radially extending discharge spout 82.

To give the tubular housing greater structural strength, I form it with a thickened peripheral wall 84 around its center. The internal diameter of the housing is reduced between the pistons. This forms a beveled annular shoulder 86 for the chamfered end of piston or head 52 to seat upon, effectively closing off outlet orifice 48 when the filler is not operating.

In operation, the filler 10 is charged with fluid through supply inlet 26 so that the fluid fills housing 34 on the conduit side of the head or piston 52. Before the confection machine with which the filler is used is started there is no supply of compressed air available to cylinder 68 and head 52 is biased over the outlet orifice 48. On the starting of the machine, air is supplied to cylinder 68 causing the piston 70 to move plunger 50 till head 52 abuts stop 60. This opens outlet orifice 48. Simultaneously, the mold conveyor C starts and the conveyor drives shaft 18 through bevel gears 20 and 76, rotating the sleeve 74. The timing of the sleeve rotation is such that as each mold comes under the filler one of the spouts 82 has its mouth aligned therewith. During this alignment the aperture 80 associated with the spout is in registry with orifice 48. This alignment and registry permits fluid to pass out of the housing through the spout and into the mold below. As the movement of the mold on the conveyor continues so will the rotation of the sleeve, until after the mold has passed, the aperture 80 will no longer be in registry with outlet orifice 48 and the fluid flow will be cut off.

If it is desired to run the filler at a high rate of speed, or if the fluid is extremely thin, the housing 34 may be turned slightly so that outlet orifice 48 slightly faces the direction of the oncoming molds. Thus, the discharge of fluid from the housing will commence slightly before the arrival of the respective mold, giving the fluid time to travel the length of its spout before arrival of the mold.

If the fluid is extremely thin, as with a popsicle mix, or if the pressure of the fluid in the housing is great, it may be desired to close off a portion of the orifice 48. To accomplish this the stop 60 is turned inwardly forcing the piston or head 52 to a position where its side walls do partly occlude the orifice. By nut 64, the stop may be locked in the appropriate position.

The purpose of the piston 100 is manifest. Any force which the pressure of the fluid exerts in a *leftward* direction on piston 52 will be equalized by the corresponding force of the fluid on piston 100 in a *rightward* direction as shown in FIGURE 3. Thus, movement of the plunger 50 by the pressure of the fluid in the tubular housing 34 is precluded. The fluid cannot force the piston 52 to open the discharge orifice.

From the above description it can be seen that I have invented a simple and dependable means to preclude the movement of the piston of an automatic filler by the pressure of the fluid within the fluid housing. This means is simple and inexpensive to apply to the apparatus and, at the same time, fool-proof in its operation.

While this invention has been shown in but one form, it is obvious to those skilled in the art that it is not so limited but is susceptible of various changes and modifications without departing from the spirit and scope of the claimed invention.

I claim:
1. A dispenser adapted to dispense a controlled quantity of fluid at timed intervals into each of a plurality of receptacles adapted to be passed thereunder in continuous motion, said dispenser comprising a tubular housing adapted to contain such fluid, said housing having a discharge orifice in the peripheral wall thereof, said housing in the area of said orifice having a sleeve adapted to rotate about said tubular housing, said sleeve having a plurality of apertures around the periphery thereof, a tubular radially extending filler spout extending outwardly from the sleeve at each aperture, means to rotate said sleeve whereby said apertures are successively brought into registry with said orifice, and means for lessening the dimension of said orifice, said last named means comprising a plunger fitting inside the tubular housing in liquid-tight relation, said plunger adapted to be reciprocated by means without said housing.

2. A dispenser as described in claim 1 wherein said plunger comprises a head and a stem, said stem being reciprocable from without said housing by pneumatic means, said stem extending through one end of said housing.

3. A dispenser as described in claim 2 wherein stop means extend axially of the housing and is directed inwardly through the end of the housing opposite the end through which the stem extends.

4. A dispenser as described in claim 3 wherein said stop means is threaded and axially adjustable of said housing by said thread.

5. In combination a conveyor moving continuously a plurality of successively arranged molds and a dispenser adapted to fill said molds with fluid, said dispenser comprising a tubular housing adapted to contain said fluid, said housing having a discharge orifice in the peripheral wall thereof, said housing in the area of said orifice having a sleeve adapted to rotate about said tubular housing, said sleeve having a plurality of apertures around the periphery thereof, tubular radially extending filler spouts extending outwardly from the sleeve at each aperture respectively, means to rotate said sleeve whereby said apertures are successively brought into registry with said orifice, and means for lessening the dimensions of said orifice, said last named means comprising a plunger fitting inside the tubular housing in liquid-tight relation, said plunger adapted to be reciprocated by means without said housing, the rotation of said sleeve and movement of said conveyor being so related that a registry of an aperture and the orifice occurs when one of said molds is in filling position with regard to the spout associated with said registering aperture.

6. Apparatus according to claim 5 wherein said tubular housing has a supply inlet and said plunger comprises a first head cooperating with said orifice, a stem extending through said tubular housing and through an end thereof for said reciprocation by said means without the housing and a second head mounted on said stem and fitting inside said tubular housing in liquid-tight relation on the opposite side of said supply inlet from said first-mentioned head.

7. A dispenser adapted to dispense a controlled quantity of fluid at timed intervals into each of a plurality of receptacles adapted to be passed thereunder in continuous motion, said dispenser comprising a tubular housing adapted to contain such fluid, said housing having a supply inlet and a discharge orifice in the peripheral wall thereof, said housing in the area of said orifice having a sleeve adapted to rotate about said tubular housing, said sleeve having a plurality of apertures around the periphery thereof, a tubular radially extending filler spout extending outwardly from the sleeve at each aperture, means to rotate said sleeve whereby said apertures are successively brought into registry with said orifice, means for lessening the dimension of said orifice, said last named means comprising a plunger fitting inside the tubular housing in liquid-tight relation, said plunger comprising a first head cooperating with said orifice, a stem extending through said tubular housing and through an end thereof and adapted to be reciprocated by means without said housing and a second head mounted on said stem and fitting inside said tubular housing in liquid-tight relation on the opposite side of said supply inlet from said first-mentioned head.

8. A dispenser as described in claim 7 wherein stop means extend axially of the housing and is directed inwardly through the end of the housing opposite the end through which the stem extends.

9. A dispenser as described in claim 8 wherein said stop means is threaded and axially adjustable of said housing by said thread.

References Cited in the file of this patent
UNITED STATES PATENTS

| | | |
|---|---|---|
| 515,703 | Birkery | Feb. 27, 1894 |
| 1,195,253 | Naslund | Aug. 22, 1916 |
| 1,867,004 | Hacker | July 12, 1952 |